Figure 1:
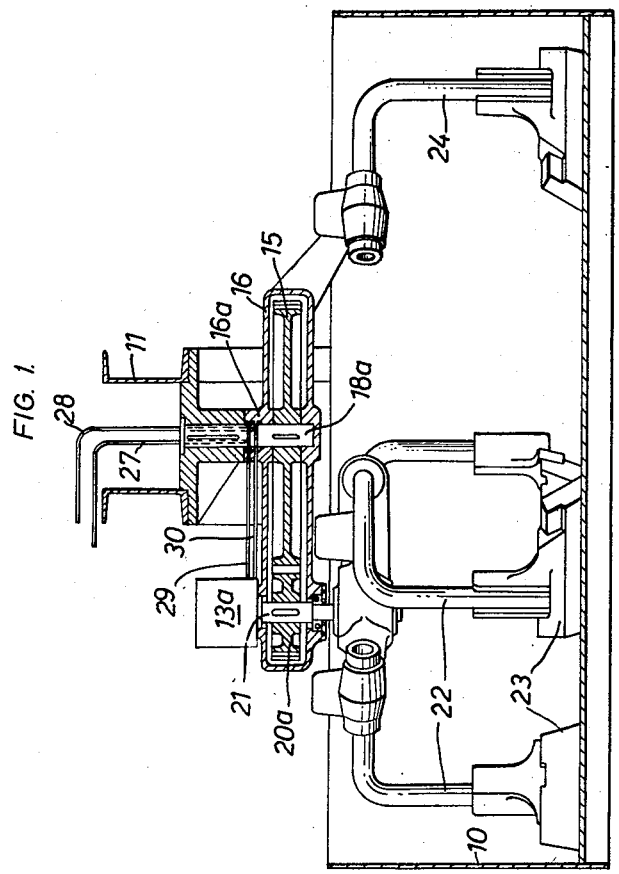

Dec. 8, 1964　　　K. J. HARRISON　　　3,160,399
MIXING MACHINES
Filed Sept. 25, 1961　　　　　　　　2 Sheets-Sheet 1

INVENTOR:
Kenneth James Harrison
BY
Johnson and Kline
ATTORNEYS

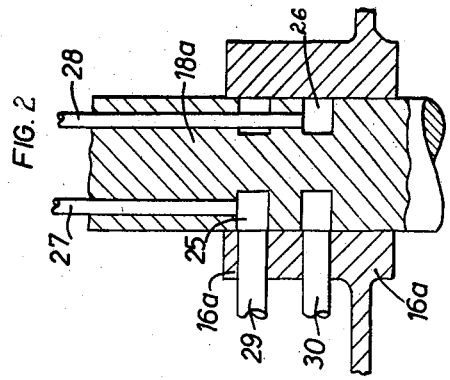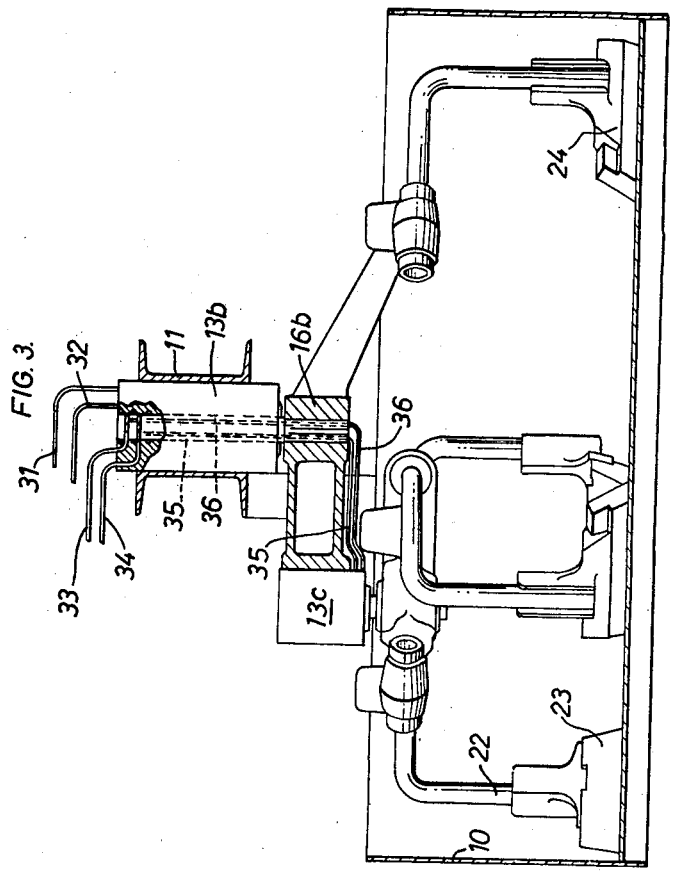

United States Patent Office 3,160,399
Patented Dec. 8, 1964

3,160,399
MIXING MACHINES
Kenneth James Harrison, Gosforth, Newcastle-upon-Tyne, England, assignor to The Liner Concrete Machinery Company Limited, Gateshead, England
Filed Sept. 25, 1961, Ser. No. 140,281
Claims priority, application Great Britain, Sept. 27, 1960, 33,099/60
1 Claim. (Cl. 259—178)

This invention is for improvements in or relating to mixing machines and is particularly concerned with machines for mixing granular materials. The invention is especially, although not exclusively, applicable to concrete mixing machines.

The invention is concerned with mixing machines of the kind (hereinafter referred to as the kind specified) comprising a stationary pan and a mixing unit or device which has its own axis of rotation and is also designed to rotate around the mixing pan. For instance, the mixing device may have a planetary form of motion with respect to the pan. Mixing machines of this kind sometimes have more than one such mixing device. The mixing device itself frequently comprises a hub or nave mounted on a driving shaft and carrying one or more radial or outwardly projecting arms, each of which is provided at its extremity with a mixing blade or paddle which projects well down into the pan. The mix is usually discharged from the pan through an opening in the base thereof provided with a movable shutter or door.

One object of the present invention is to provide a mixing machine of the above kind which embodies a relatively inexpensive and simple means for driving the mixing device or devices about its own axis or their own axes, and also for driving the mixing device around the pan.

According to the present invention there is provided a mixing machine of the above kind wherein rotation or gyration of the mixing device or devices about its or their own axis or axes and/or movement of the mixing device or devices around the mixing pan is effected by a hydraulic motor or motors.

Two specific embodiments of the invention will now be described by way of example with reference to the accompanying drawings, wherein:

FIGURE 1 is a sectional elevation of one embodiment,
FIGURE 2 is an enlarged sectional view of part of the embodiment shown in FIGURE 1, and
FIGURE 3 shows the second embodiment in sectional elevation.

Referring first to the embodiment of the invention shown in FIGURES 1 and 2, 10 indicates the stationary mixing pan which has a bridge 11 extending across its upper part. Centrally fixed in the bridge 11 is a vertical shaft 18a which has a gear wheel 15 fixed to it. The gear wheel 15 is housed in a gear casing 16 which is rotatably supported on the shaft 18a.

The gear casing 16 rotatably supports within it a pinion 20a which meshes with the stationary gear wheel 15 and has a shaft 21 the lower end of which carries a star-like arrangement of arms 22 on the extremities of which the mixing blades 23 are secured. The shaft 21 is driven by a hydraulic motor 13a mounted on the extremity of the casing 16 which extends radially over the pan towards the periphery thereof.

It will be appreciated that, inasmuch as the pinion 20 meshes with the stationary gear wheel 15, when the shaft 21 of the motor 13a is rotated not only will the casing 16 rotate so as to carry the blade unit or star 22, 23 as a whole around the pan but the mixing unit itself 22, 23 will also be rotated about an axis through the shaft 21.

In the particular embodiment of the invention shown in FIGURE 1 in addition to the mixing star 22, 23 the casing 16 itself carries one or more mixing elements, one such mixing element being indicated at 24.

Conveniently oil under pressure for the operation of the hydraulic motor or motors is provided by one or more pumps driven by a prime mover e.g. an internal combustion engine or electric motor. Alternatively, the hydraulic motor or motors may be driven by oil under pressure from a supply main where such is available.

With an arrangement as just described it is necessary to provide a fluid-tight rotatable arrangement of piping or the like by which pressure fluid can be supplied to and exhausted from the motor 13a. In the particular arrangement shown (see FIGURE 2) the shaft 18a is provided with circumferential grooves 25 and 26 and pressure fluid supply and exhaust pipes 27 and 28, which pass down through the stationary shafts 18a, communicate respectively with these circumferential grooves. The grooves themselves communicate respectively with pressure fluid supply and exhaust pipes 29 and 30 which extend from the hub 16a of the casing 16 to the hydraulic motor 13a, the pipes 29 and 30 rotating with the casing 16 and the motor 13a.

The embodiment of the invention shown in FIGURE 3 is similar in some respects to the embodiment with reference to FIGURES 1 and 2 previously described. In the embodiment of the invention shown in FIGURE 3 there are two separate hydraulic motors, the motor 13b driving a spider or the like 16b which rotates the mixing units or elements about a central axis through the base of the pan and the hydraulic motor 13c rotating the mixing unit or star 22, 23.

Pressure fluid supply and exhaust pipes 31 and 32 are provided for the motor 13b and 33 and 34 for the motor 13c. The latter pipes communicate by way of grooves in the shaft of the motor 13b, with pipes 35 and 36 running through the shaft of said motor and having radial arms connected to the motor 13c. The arrangement is similar to that described with reference to FIGURES 2 and 3 and is such that the pipe system 33, 34, 35 and 36 does not interfere with or create any difficulties due to the rotation of the motor 13c on the spider 16b about the axis of the pan.

The advantage of using separate motors as described with reference to FIGURE 3 is that their speeds can be pre-set or adjusted differentially without necessarily providing special change speed gearing.

I claim:

A concrete mixing machine comprising a stationary pan, a bridge extending over the upper part of said pan, a vertical shaft, means carried by said bridge and supporting said vertical shaft and holding it against rotation, a radially extending member mounted for rotation on said vertical shaft and extending over the pan towards the periphery thereof, a hydraulic driving motor mounted at the extremity of said radially extending member, a mixing unit secured on a driven shaft of said hydraulic motor for rotation thereby and depending into the pan, a pinion keyed to said driven shaft of the hydraulic motor, a gear wheel keyed to said vertical shaft and meshing with said pinion whereby a planetary motion is given to said rotary mixing unit about the axis of the pan, and a hydraulic fluid system for the hydraulic motor, a part of said system comprising annular groove means in said vertical shaft, duct means extending longitudinally of said vertical shaft and communicating with said annular groove means and pipes extending between said annular groove means and the hydraulic motor.

(References on following page)

References Cited by the Examiner

UNITED STATES PATENTS

| | | | |
|---|---|---|---|
| 944,621 | 12/09 | Larock | 259—129 |
| 1,612,281 | 12/26 | Goetz | 259—129 |
| 2,345,163 | 3/44 | Vollrath | 259—102 |
| 2,840,357 | 6/58 | Nauta | 259—102 X |
| 3,023,580 | 3/62 | Dilg | 259—135 X |

FOREIGN PATENTS

| | | |
|---|---|---|
| 680,658 | 8/39 | Germany. |
| 1,079,001 | 5/54 | France. |
| 1,021,986 | 1/58 | Germany. |

CHARLES A. WILLMUTH, *Primary Examiner.*

J. S. SHANK, *Examiner.*